(12) United States Patent
Qin et al.

(10) Patent No.: US 9,508,499 B2
(45) Date of Patent: Nov. 29, 2016

(54) RECREATIONAL VEHICLE BEAM SWITCH ASSEMBLY

(71) Applicants: Lei Qin, Jiangsu (CN); Xiansi Zhu, Morristown, NJ (US); Li Zheng, Morristown, NJ (US); Dongmei Deng, Jiangsu (CN)

(72) Inventors: Lei Qin, Jiangsu (CN); Xiansi Zhu, Morristown, NJ (US); Li Zheng, Morristown, NJ (US); Dongmei Deng, Jiangsu (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/430,290

(22) PCT Filed: Oct. 3, 2012

(86) PCT No.: PCT/CN2012/082518
§ 371 (c)(1),
(2) Date: Mar. 23, 2015

(87) PCT Pub. No.: WO2014/053072
PCT Pub. Date: Apr. 10, 2014

(65) Prior Publication Data
US 2015/0279585 A1    Oct. 1, 2015

(51) Int. Cl.
*H01H 9/22* (2006.01)
*H01H 9/06* (2006.01)
(Continued)

(52) U.S. Cl.
CPC ............ *H01H 9/223* (2013.01); *B60Q 1/0076* (2013.01); *B60Q 1/1453* (2013.01); *H01H 9/06* (2013.01); *B60K 37/06* (2013.01); *H01H 13/56* (2013.01); *H01H 2009/068* (2013.01)

(58) Field of Classification Search
CPC ........ B60K 37/06; H01H 9/06; H01H 13/56; H01H 9/223; H01H 2009/068; B60Q 1/1453; B60Q 1/0076

USPC ................. 200/43.16, 318.1, 523, 525, 61.5, 200/61.48, 61.45 R, 61.53
See application file for complete search history.

(56) References Cited

U.S. PATENT DOCUMENTS 500,200 A    6/1893   George, Jr.
4,112,278 A    9/1978   Greiner et al.
(Continued)

FOREIGN PATENT DOCUMENTS

CN        1598991 A   *   3/2005   ............. H01H 13/68

OTHER PUBLICATIONS

Biker's Choice Mini Push Button Switch; Retrieved from Internet [www.cruisercustomizing.com/mini-push-button-switch/part/BC-49/3225] Aug. 13, 2012.
(Continued)

*Primary Examiner* — Edwin A. Leon
(74) *Attorney, Agent, or Firm* — Conley Rose, P.C.; Kristin Jordan Harkins

(57) ABSTRACT

A switch assembly (108) includes a housing (202), a switch (204), a lock mechanism (206), and an input element (208). The switch (204) is disposed within the housing (202) and configured to translate, along a first axis (212), between a first switch position and a second switch position. The lock mechanism (206) is disposed within the housing (202) and configured to translate, along a second axis (216) that is parallel to the first axis (212), between an unlock position and a lock position. The input element (208) is coupled to the switch (204) and the lock mechanism (206) and is movable relative to the housing (202). The input element (208) is adapted to receive an input force and is configured, upon receipt thereof to selectively and simultaneously move the switch (204) and the lock mechanism (206) between the first and second switch positions and the unlock and lock positions, respectively.

20 Claims, 3 Drawing Sheets

(51) Int. Cl.
  *B60Q 1/14* (2006.01)
  *B60Q 1/00* (2006.01)
  *B60K 37/06* (2006.01)
  *H01H 13/56* (2006.01)

(56) References Cited

U.S. PATENT DOCUMENTS

| | | | |
|---|---|---|---|
| 4,392,029 A | 7/1983 | Schaad et al. | |
| 4,467,160 A * | 8/1984 | Murmann | H01H 13/12 200/342 |
| 4,508,944 A | 4/1985 | Yashima et al. | |
| 4,565,909 A | 1/1986 | Yashima et al. | |
| 4,641,723 A | 2/1987 | Takanashi et al. | |
| 4,710,599 A | 12/1987 | Motodate et al. | |
| 5,380,970 A * | 1/1995 | Mizuno | H01H 13/562 200/517 |
| 5,720,379 A | 2/1998 | Schwartz et al. | |
| 6,166,339 A | 12/2000 | Bechis | |
| 6,695,090 B2 | 2/2004 | McAllister | |
| 6,770,829 B1 | 8/2004 | Hart | |
| 6,937,149 B2 | 8/2005 | McMahon | |
| 7,402,767 B2 | 7/2008 | Tozuka et al. | |
| 2010/0270135 A1 | 10/2010 | Murasawa et al. | |

OTHER PUBLICATIONS

National Cycle Handlebar Switch for National Cycle Light Bar (Fits 1 Inch Diameter Round Handlebars); Retrieved from Internet [www.cruisercustomizing.com/handlebar-switch-for-national-cycle-light-bar-fits-1-inch-diameter-round-handlebars/part/NC-N9001] Aug. 13, 2012.

Show Chrome Accessories (Big Bike Parts) Dual Accessory Switch Block—1 inch Cruiser Bars; Retrieved from Internet [www.cruisercustomizing.com/dual-accessory-switch-block-1-inch-cruiser-bars/part/ . . . ] Aug. 13, 2012.

* cited by examiner

RECREATIONAL VEHICLE BEAM SWITCH ASSEMBLY

TECHNICAL FIELD

The present invention generally relates to switches, and more particularly relates to a beam switch assembly for recreational vehicles.

BACKGROUND

Many recreational vehicles, such as, for example, all-terrain vehicles (ATVs), roadsters, and snowmobiles, include various controls that are mounted on the vehicle handle bars. In many instances, both the left and right handle bars have controls mounted thereon. In a typical arrangement, the right handle bar will have some type of throttle control device mounted thereon, and the left handle bar will have a beam switch mounted thereon. Though configurations may vary, the beam switches on recreational vehicles are used to manually switch the vehicle light between the low-beam position and the high-beam position.

For many recreational vehicle beam switches, the default position is the low-beam position. When an operator depresses the beam switch once, it moves to and is locked in the high-beam position. Thereafter, if the operator again depresses the beam switch, it will unlock and return to the default low-beam position. Presently known beam switches that implement this functionality include a switch mechanism and a lock mechanism that are coaxially disposed, which results in a relatively large space envelope, and are functionally interrelated, which can cause inoperability of the switch mechanism if the lock mechanism becomes inoperable.

Hence, there is a need for a vehicle beam switch assembly that has a relatively small space envelope as compared to present switch assemblies and/or allows the switch mechanism to remain operable if the lock mechanism becomes inoperable. The present invention addresses at least these needs.

BRIEF SUMMARY

In one embodiment, a switch assembly includes a housing, a switch, a lock mechanism, and an input element. The switch is disposed within the housing and is configured to translate, along a first axis, between a first switch position and a second switch position. The lock mechanism is disposed within the housing assembly and is configured to translate, along a second axis that is parallel to the first axis, between an unlock position and a lock position. The input element is coupled to the switch and to the lock mechanism and is movable relative to the housing. The input element is adapted to receive an input force and is configured, upon receipt thereof to selectively and simultaneously move the switch and the lock mechanism between the first and second switch positions and the unlock and lock positions, respectively.

In another embodiment, a switch assembly includes a housing, a switch, a switch spring, a lock mechanism, and an input element. The housing has an outer wall and an inner wall. The inner wall defines a switch cavity and a lock cavity within the housing. The switch is disposed at least partially within the switch cavity and is configured to translate, along a first axis, between a first switch position and a second switch position. The switch spring is disposed within the switch cavity and is configured to bias the switch toward the first switch position. The lock mechanism is disposed at least partially within the lock cavity and is configured to translate, along a second axis that is parallel to the first axis, between an unlock position and a lock position. The input element is coupled to the switch and to the lock mechanism and is movable relative to the housing. The input element is adapted to receive an input force and is configured, upon receipt thereof, to selectively and simultaneously move the switch and the lock mechanism between the first and second switch positions and the unlock and lock positions, respectively.

In yet another embodiment, a switch assembly includes a housing, a switch, a switch spring, a lock mechanism, and an input element. The housing has an outer wall and an inner wall. The inner wall defines a switch cavity and a lock cavity within the housing. The lock cavity has an inner surface that is configured to implement a cam. The switch is disposed at least partially within the switch cavity and is configured to translate, along a first axis, between a first switch position and a second switch position. The switch spring is disposed within the switch cavity and is configured to bias the switch toward the first switch position. The lock mechanism is disposed at least partially within the lock cavity and is configured to translate, along a second axis that is parallel to the first axis, between an unlock position and a lock position. Then input element is coupled to the switch and to the lock mechanism and is movable relative to the housing. The input element is adapted to receive an input force and is configured, upon receipt thereof to selectively and simultaneously move the switch and the lock mechanism between the first and second switch positions and the unlock and lock positions, respectively. The lock mechanism includes a push button, a cam follower, and a lock mechanism spring. The push button engages the input element and is configured to selectively move between an extended position and a retracted position. The cam follower engages the push button and the cam and is configured, in response to movement of the push button, to selectively move between the unlock and the lock positions. The lock mechanism spring engages the cam follower and is configured to bias the lock mechanism toward the unlock position.

Furthermore, other desirable features and characteristics of the switch assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, although the switch assembly is described herein as being implemented on the handle bar of a recreational vehicle, it may be implemented in numerous and varied environments and systems.

Figure 1:
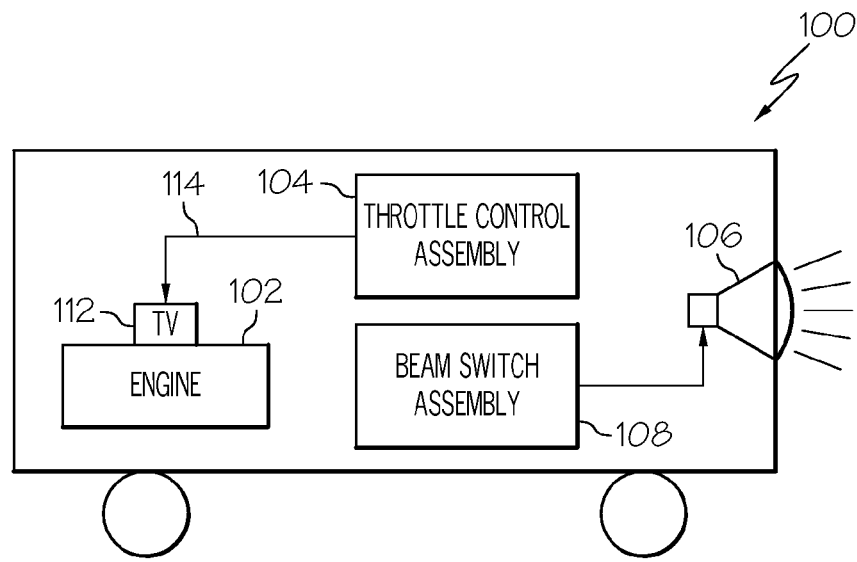
FIG. 1 depicts a simplified functional block diagram of a vehicle.

Referring to FIG. 1, a simplified functional block diagram of a vehicle 100 is depicted. The depicted vehicle 100 includes, among various other non-illustrated components, an engine 102, a throttle control assembly 104, a light 106, and a beam switch assembly 108. The engine 102, at least in the depicted embodiment, is a gas-powered, internal combustion engine. The rotational speed of the engine 102, and thus the speed and acceleration of the vehicle 100, is varied by controlling the flow rate of air into the engine 102, and thus the fuel/air ratio.

The flow rate of air into the engine 102 is controlled via the throttle control assembly 104. In the depicted embodiment, the throttle control assembly 104 controls the flow rate of air by varying the position of a throttle valve 112. To do so, the throttle control assembly 104, which is disposed remote from the throttle valve 112, is coupled to the throttle valve 112 via a throttle cable 114. An operator of the vehicle 100 may position the throttle valve 112, and thus control the speed and acceleration of the vehicle 100, by manually positioning the throttle control assembly 104.

The light 106, as is generally known, is energized from a non-illustrated power source, such as a rechargeable battery. The light 106 is preferably a multi-luminance light that may be energized to emit relatively low-luminance light or relatively high-luminance light. The light 106 is controllably energized to emit the low- or high-luminance light via the beam switch assembly 108, an embodiment of which will now be described in more detail.

Figure 2:
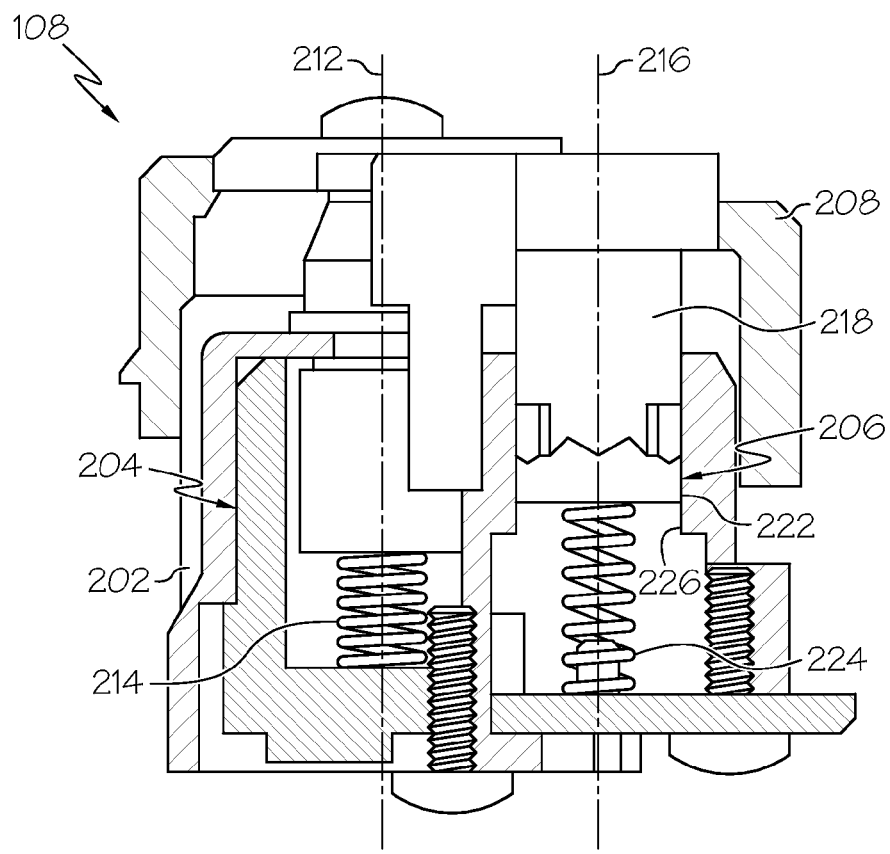
FIGS. 2 and 3 depict partially transparent views of a switch assembly that may be disposed on the vehicle of FIG. 1 and used to implement a beam switch.
Figure 3:
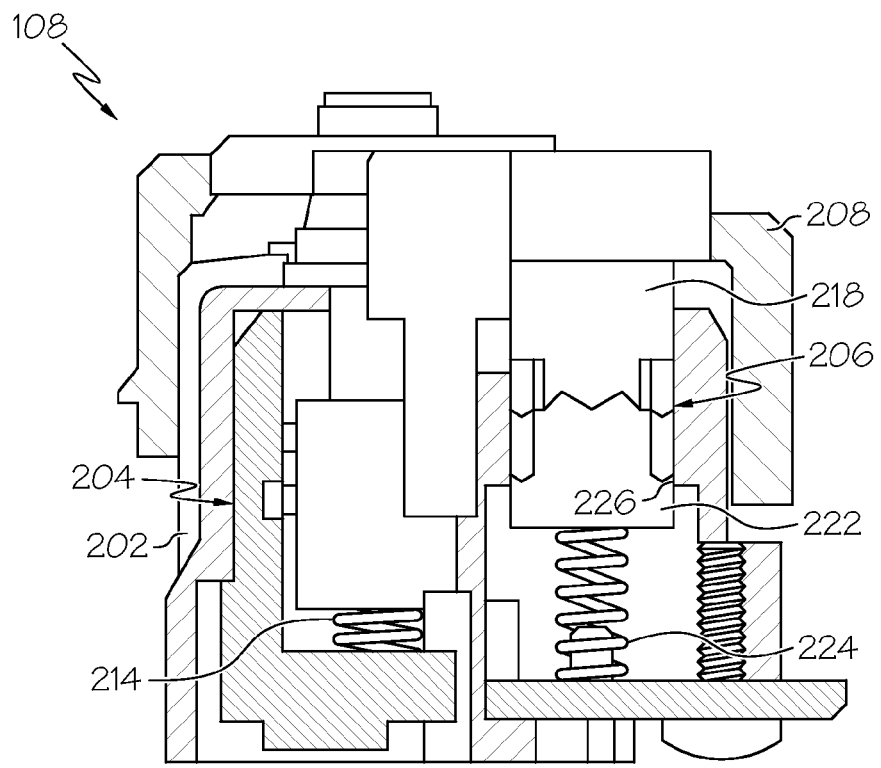
Figure 4:
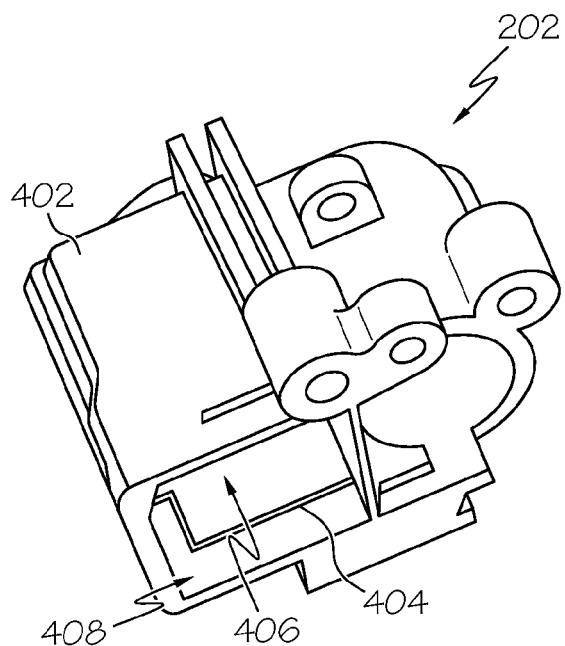
FIG. 4 depicts a plan view of a housing that may be used to implement the switch assembly of FIGS. 2 and 3.

Referring to FIGS. 2 and 3, it is seen that the depicted switch assembly 108 includes a housing 202, a switch 204, a lock mechanism 206, and an input element 208. The housing 202, an embodiment of which is depicted most clearly in FIG. 4, includes an outer wall 402 and an inner wall 404. The inner wall 404 defines two cavities within the housing 202—a switch cavity 406 and a lock cavity 408.

Returning now to FIGS. 2 and 3, the switch 204 is disposed at least partially within the housing 202, and more specifically, at least partially within the switch cavity 406. The switch 204, which may be implemented using any one of numerous types of multi-position switches, is configured to translate, along a first axis 212, between a first switch position, which is the position depicted in FIG. 2, and a second switch position, which is the position depicted in FIG. 3. Although the first and second switch positions may correspond to differing functional positions, depending on the end-use of the switch assembly 108, in the depicted embodiment, the first and second switch positions correspond to low-beam and high-beam positions, respectively. Thus, when the switch 204 is in the first position, it is configured to controllably energize the light 106 to emit low-luminance light, and when the switch is in the second position, it is configured to controllably energize the light 106 to emit high-luminance light. As FIGS. 2 and 3 also depict, a switch spring 214 is preferably disposed within the switch cavity 406 and is configured to bias the switch 204 toward the first switch position.

The lock mechanism 206 is disposed at least partially within the housing 202, and more specifically at least partially within the lock cavity 408. The lock mechanism 206 is configured to translate, along a second axis 216, between an unlock position, which is the position depicted in FIG. 2, and a lock position, which is the position depicted in FIG. 3. The second axis 216 is not coaxial to the first axis 212. Rather, the second axis 216 is offset from and is parallel to the first axis 212. As may thus be appreciated, the lock mechanism 206 is in the unlock position whenever the switch 204 is in the first position, and is in the lock position whenever the switch 204 is in the second position (and vice-versa).

Although the lock mechanism 206 may be variously configured to implement its functionality, in the depicted embodiment it is configured similar to a locking device on a retractable ball-point pen. In the regard, the depicted lock mechanism 206 includes a push button 218, a cam follower 222, and a lock mechanism spring 224. The push button 218 engages the input element 208 and is configured to selectively move between an extended position (FIG. 2) and a retracted position (FIG. 3). The cam follower 222 engages the push button 218 and a cam 226 that is defined on the inner surface of the lock cavity 408. The cam follower 222 is configured, in response to movement of the push button 218, to selectively move between the unlock (FIG. 2) and the lock (FIG. 3) positions. The lock mechanism spring 224 engages the cam follower 222 and is configured to bias the lock mechanism 206 toward the unlock position.

Figure 5:
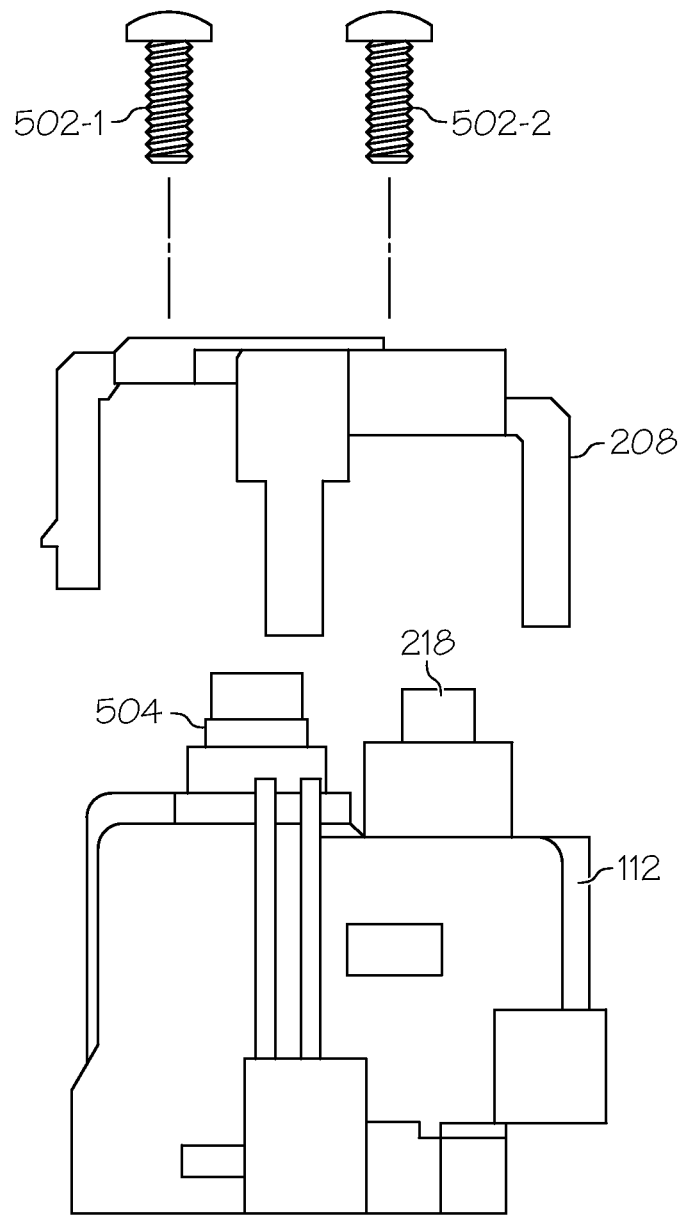
FIG. 5 depicts a partially disassembled view of the switch assembly of FIGS. 2 and 3.

The input element 208 is coupled to both the switch 204 and the lock mechanism 206, and is movable relative to the housing 202. Although the input element 208 may be coupled to the switch 204 and the lock mechanism 206 using any one of numerous suitable techniques, as shown most clearly in FIG. 5, the input element 208 is coupled to the switch 204 and the lock mechanism 206 via fasteners 502 (502-1, 502-2), such as threaded screws. In particular, each screw 502 extends through an opening in the input element 208 and is threaded into a like threaded opening in the switch 204 and lock mechanism 206. In the depicted embodiment, a flexible rubber cap 504 is disposed over a portion of the switch 204 and extends through the same opening in the input element as does one of the screws 502-1. This screw 502-1 also extends through the cap 504. No matter how the input element 208 is coupled to the switch 204 and lock mechanism 206, it is adapted to receive an input force from a user and is configured, upon receipt of the input force, to selectively and simultaneously move the switch 204 and the lock mechanism 206 between the first and second switch positions and the unlock and lock positions, respectively.

The switch assembly 108 described herein provides numerous advantages over those that are presently known. In particular, the switch assembly 108 is modularly implemented, in that the switching function and the locking function are separately implemented. Thus, the switch assembly 108 could, if needed or desired, be implemented without the locking function. Moreover, if the locking function were to become inoperable, the switching function would remain operable. The switch assembly 108 is more compact than presently known devices, and may thus be used in a wide variety of applications beyond the recreational vehicle environment. The switch assembly 108 may also be readily and easily assembled.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A switch assembly, comprising:
a housing;
a switch disposed within the housing and configured to translate, along a first axis, between a first switch position and a second switch position;
a lock mechanism disposed within the housing and configured to translate, along a second axis that is parallel to the first axis, between an unlock position and a lock position; and
an input element coupled to the switch and to the lock mechanism and movable relative to the housing, the input element adapted to receive an input force and configured, upon receipt thereof to selectively and simultaneously move the switch and the lock mechanism between the first and second switch positions and the unlock and lock positions, respectively.

2. The switch assembly of claim 1, wherein the housing comprises:
a lock opening within which the lock mechanism is at least partially disposed.

3. The switch assembly of claim 2, wherein:
the lock opening is defined by an inner surface that is configured to implement a cam.

4. The switch assembly of claim 1, further comprising a switch spring disposed within the housing and configured to bias the switch toward the first switch position.

5. The switch assembly of claim 1, further comprising a lock mechanism spring disposed within the housing and configured to bias the lock mechanism toward the unlock position.

6. The switch assembly of claim 1, wherein the housing comprises:
an outer wall; and
an inner wall that defines a switch cavity and a lock cavity within the housing.

7. The switch assembly of claim 6, wherein:
the switch is disposed at least partially within the switch cavity; and
the lock mechanism is disposed at least partially within the lock cavity.

8. A switch assembly, comprising:
a housing having an outer wall and an inner wall, the inner wall defining a switch cavity and a lock cavity within the housing;
a switch disposed at least partially within the switch cavity and configured to translate, along a first axis, between a first switch position and a second switch position;
a switch spring disposed within the switch cavity and configured to bias the switch toward the first switch position;
a lock mechanism disposed at least partially within the lock cavity and configured to translate, along a second axis that is parallel to the first axis, between an unlock position and a lock position; and
an input element coupled to the switch and to the lock mechanism and movable relative to the housing, the input element adapted to receive an input force and configured, upon receipt thereof, to selectively and simultaneously move the switch and the lock mechanism between the first and second switch positions and the unlock and lock positions, respectively.

9. The switch assembly of claim 8, wherein:
the lock cavity is defined by an inner surface that is configured to implement a cam.

10. The switch assembly of claim 8, further comprising a lock mechanism spring disposed within the lock cavity and configured to bias the lock mechanism toward the unlock position.

11. A switch assembly, comprising:
a housing having an outer wall and an inner wall, the inner wall defining a switch cavity and a lock cavity within the housing, the lock cavity having an inner surface that is configured to implement a cam;
a switch disposed at least partially within the switch cavity and configured to translate, along a first axis, between a first switch position and a second switch position;
a switch spring disposed within the switch cavity and configured to bias the switch toward the first switch position;
a lock mechanism disposed at least partially within the lock cavity and configured to translate, along a second axis that is parallel to the first axis, between an unlock position and a lock position; and
an input element coupled to the switch and to the lock mechanism and movable relative to the housing, the input element adapted to receive an input force and configured, upon receipt thereof to selectively and simultaneously move the switch and the lock mechanism between the first and second switch positions and the unlock and lock positions, respectively, wherein the lock mechanism comprises:
a push button, the push button engaging the input element and configured to selectively move between an extended position and a retracted position,
a cam follower, the cam follower engaging the push button and the cam and configured, in response to movement of the push button, to selectively move between the unlock and the lock positions, and
a lock mechanism spring engaging the cam follower and configured to bias the lock mechanism toward the unlock position.

12. The switch assembly of claim 1, wherein the first switch position and the second switch position are configured to controllably energize a powered device at different power levels.

13. The switch assembly of claim 12, wherein the powered device comprises a light, wherein the first switch position is configured to controllably energize the light at a first luminance light level, and wherein the second switch position is configured to controllably energize the light at a second luminance light level, wherein the first luminance light level is lower than the second luminance light level.

14. The switch assembly of claim 2, wherein the housing further comprises:
a switch opening within which the switch is at least partially disposed.

15. The switch assembly of claim 3, wherein the lock mechanism comprises:
a push button, the push button engaging the input element and configured to selectively move between an extended position and a retracted position; and
a cam follower, the cam follower engaging the push button and the cam and configured, in response to movement of the push button, to selectively move between the unlock and the lock positions.

16. The switch assembly of claim 8, wherein the first switch position and the second switch position are configured to controllably energize a powered device at different power levels.

17. The switch assembly of claim 16, wherein the powered device comprises a light, wherein the first switch position is configured to controllably energize the light at a first luminance light level, and wherein the second switch position is configured to controllably energize the light at a second luminance light level, wherein the first luminance light level is lower than the second luminance light level.

18. The switch assembly of claim 9, wherein:
the lock cavity is defined by the inner surface that is configured to implement the cam; and
the lock mechanism comprises:
a push button, the push button engaging the input element and configured to selectively move between an extended position and a retracted position; and
a cam follower, the cam follower engaging the push button and the cam and configured, in response to movement of the push button, to selectively move between the unlock and the lock positions.

19. The switch assembly of claim 11, wherein the first switch position and the second switch position are configured to controllably energize a powered device at different power levels.

20. The switch assembly of claim 19, wherein the powered device comprises a light, wherein the first switch position is configured to controllably energize the light at a first luminance light level, and wherein the second switch position is configured to controllably energize the light at a second luminance light level, wherein the first luminance light level is lower than the second luminance light level.

* * * * *